Dec. 4, 1928.  
W. SHEEHY  
RABBIT HUTCH  
Filed Jan. 3, 1928
1,694,082
2-Sheets-Sheet 1
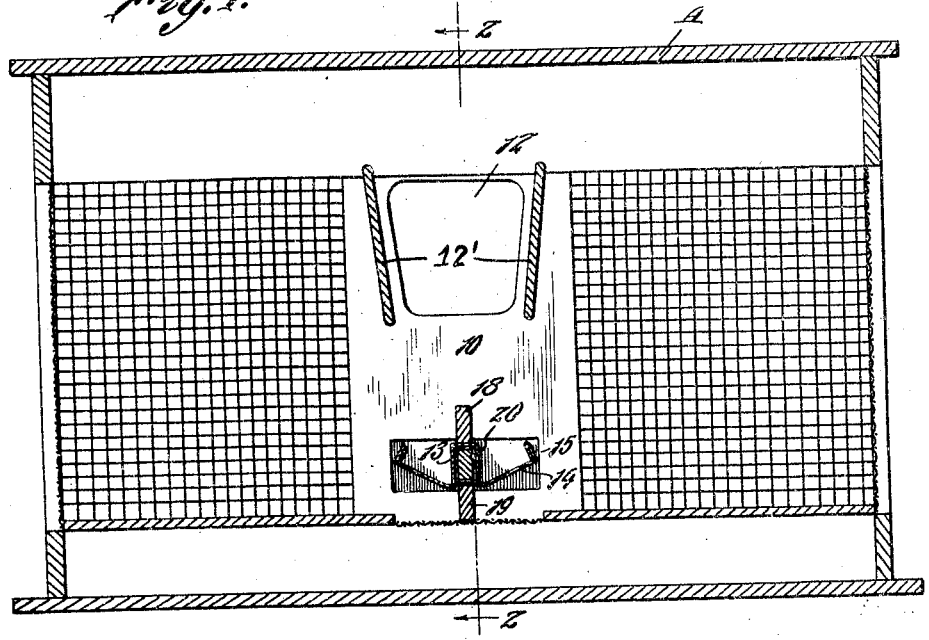
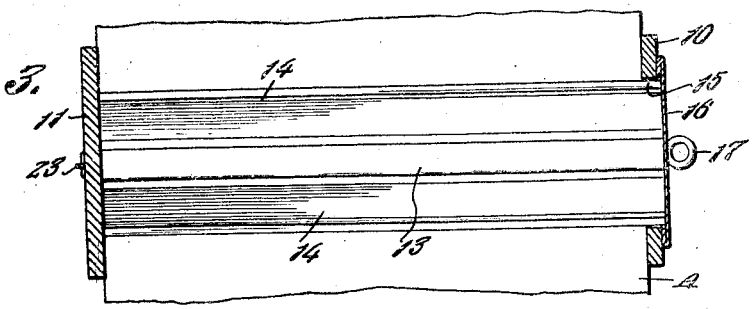
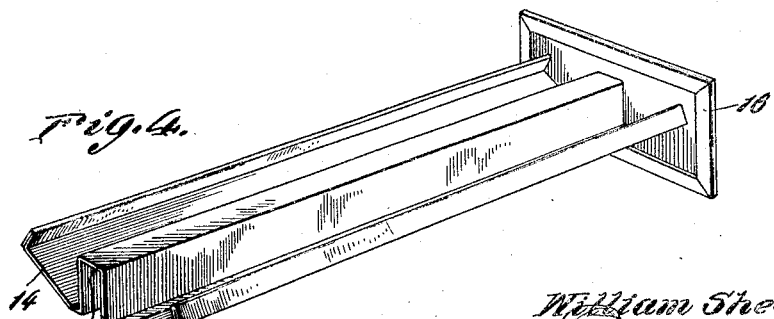
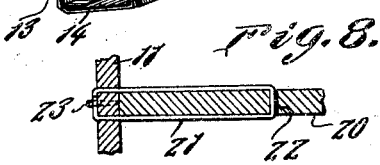
Inventor  
William Sheehy  
By Edward N. Georges  
Attorney

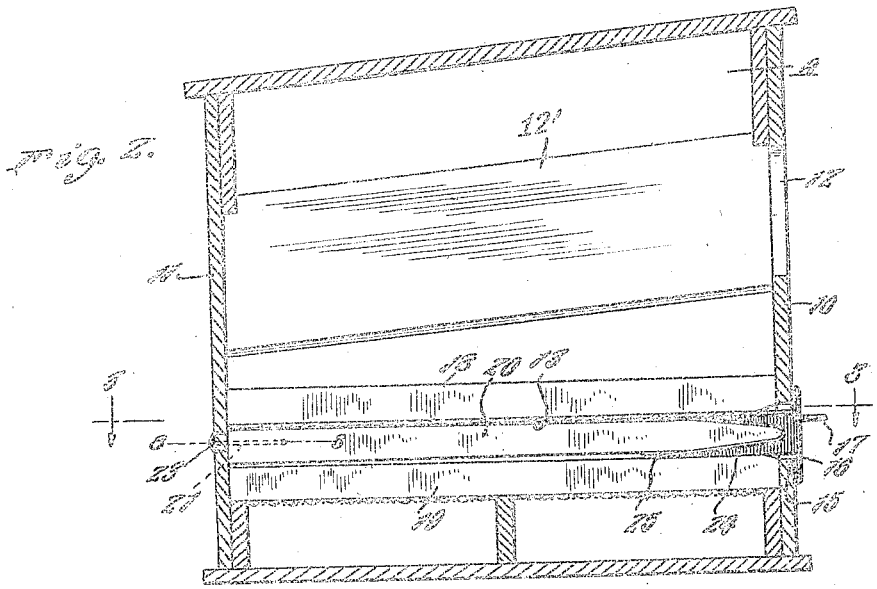
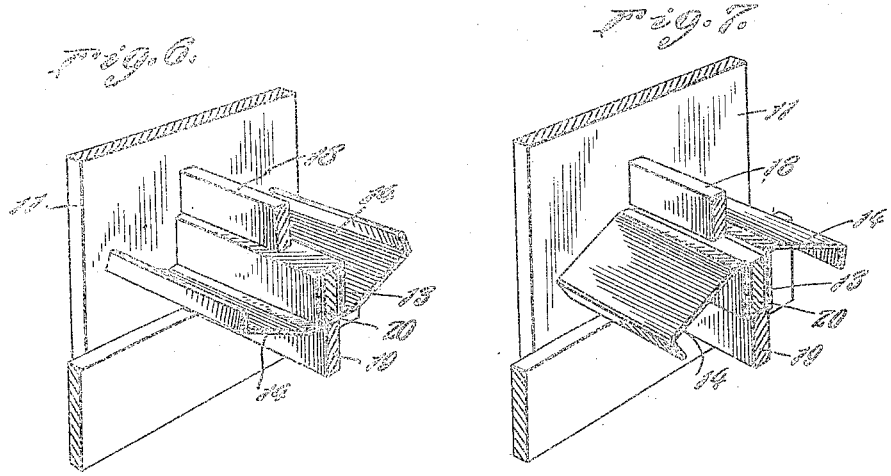
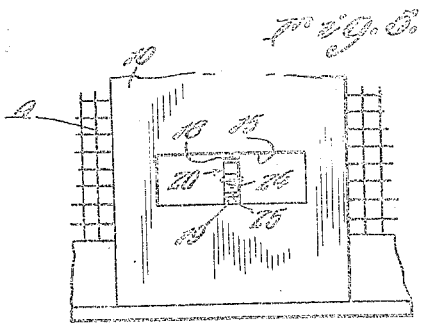

Patented Dec. 4, 1928.

1,694,082

UNITED STATES PATENT OFFICE.

WILLIAM SHEEHY, OF FONTANA, CALIFORNIA.

RABBIT HUTCH.

Application filed January 3, 1928. Serial No. 244,252.

This invention relates generally to rabbit hutches, and more specifically to the means employed for feeding rabbits.

The present day method of feeding rabbits is slow, cumbersome, expensive and very unsanitary, necessitating the cleaning of crocks and unsanitary mangers at each feeding.

It is therefore the chief characteristic of the present invention to provide both a labor saving and sanitary method of feeding rabbits, whereby the usual amount of labor and time required for cleaning out the mangers and feeding said rabbits is materially reduced, together with a reduction in the amount of feed usually wasted.

In carrying out the invention I contemplate the use of a feed trough constructed of material to make it absolutely sanitary, and designed to be arranged within the hutch in either of two positions, so that the young litters are prohibited from crawling into the trough after the feeding period.

Another object of the invention resides in constructing the trough so that it can be readily and easily inverted after each feeding period and supported in either of its two positions by the same means, the trough when inverted making it impossible for young rabbits to crawl into the same, which fact of course maintains the trough in a more sanitary condition for future use.

A further object of the invention resides in the provision of a duplex feed trough, thereby increasing the feeding surface, without taking up any additional hutch space, and making available hutch space previously occupied by crocks or pans, the trough being designed so that young litters can feed from the opposite sides thereof at the same time.

The nature and advantages of the invention will be better understood when the following detail description is read in connection with the accompanying drawings, the invention residing in the construction, combination and arrangement of parts as claimed.

In the drawings forming part of this application like numerals of reference indicate similar parts in the several views and wherein:

Figure 1 is a vertical sectional view through a hutch showing one position of the feed trough.

Figure 2 is a sectional view on line 2—2 of Figure 1.

Figure 3 is a sectional view on line 3—3 of Figure 2.

Figure 4 is a perspective view of the feed trough.

Figure 5 is a fragmentary front elevation showing the opening through which the trough is inserted and removed from the hutch.

Figure 6 is a fragmentary perspective view showing the active position of the trough.

Figure 7 is a similar view showing the inverted position of the trough.

Figure 8 is a sectional view on line 8—8 of Figure 2.

Referring to the drawings in detail A indicates generally a rabbit hutch which may be of any suitable construction, and vary in matters of size and design without departing from the inventive idea. The front center board of the hutch is indicated at 10 while the rear center board is indicated at 11, the former being provided with the usual manger opening 12, at the sides of which are arranged the partitions 12′.

In accordance with the present invention, I contemplate the use of a feed trough of novel construction, which is designed to increase the feeding surface, without taking up any additional hutch space, and at the same time make available such hutch space as is usually occupied by crocks or pans. The trough is also constructed from any suitable material to promote sanitation, and while it may vary in size and design without departing from the spirit of the invention, it is preferably of the construction illustrated in Figure 4. The trough is stamped from a single piece of material and includes a longitudinal centrally located channel portion 13 at either side of which is arranged a trough 14. The angularity of the troughs with respect to the channel-shaped portion may vary, and as a matter of fact the cross sectional contour of the trough can be of various configurations, just so long as the channel-shaped portion 13 is preserved for the purpose to be hereinafter described. The front center board 10 of the hutch is provided with an opening 15 through which the said trough is inserted within and removed from the hutch, the trough being capable of occupying either of two positions within the hutch as clearly illustrated in the drawings. The opening 15 may be closed in any suitable manner after the trough has been positioned within the hutch, but I preferably equip the trough with a cover plate 16 of a size to completely cover the opening 15 after the trough has been fully positioned within the hutch. This cover plate 16 is provided with any suitable hand hold or grip 17 so that the trough in its entirety can be conveniently handled.

As hereinabove stated the trough is adapted to be supported within the hutch in either of the two positions clearly illustrated in Figures 6 and 7, the trough being duplex in its nature, so that when it is supported in its active position as shown in Figure 6, young litters can feed from opposite sides of the trough at the same time. In order to prevent the young litters from crawling into the trough after each feeding period, the trough can be quickly and conveniently arranged within the hutch in an inverted position as illustrated in Figure 7, and in this way the trough is maintained in a very sanitary condition for future use.

While any suitable means may be employed for supporting the trough within the hutch in either of its two positions, I preferably make use of the means illustrated in the drawings, although I desire to have it understood that I do not limit myself to this exact construction, and such variations may be resorted to when desired, as fall within the scope of the appended claims. The supporting means illustrated in this specific embodiment of the invention consists in the use of three superimposed rails, the upper and lowermost rails 18 and 19 respectively being stationary and supported between the front and rear center boards of the hutch, while the intermediate rail 20 is supported by the rear center board 11 and capable of slight movement between the rails 18 and 19. While this intermediate rail may be supported for this purpose in any desired manner, it is preferably connected with the rear center board by means of a spring steel wire loop 21 which passes through an opening 22 in the said rail 20 and also through openings in the rear center board 11, the loop being secured to the latter by a staple or any other suitable fastening element 23. This construction is clearly illustrated in Figure 8, and permits the center rail to yield or move with relation to the upper and lowermost rails, so that the trough can be conveniently and quickly inserted within the hutch in either of its two positions. For this purpose the center rail is also beveled toward its free end as clearly illustrated in Figure 2, and this beveled extremity is surrounded by a resilient wear plate 24, one end of which is slightly offset as at 25, so that the center rail is always maintained in close contact with relation to the trough when the latter is arranged in position for use. It will be observed from an inspection of Figure 2 that the center rail 20 terminates within the opening 15, so that it can be readily received by the channel-shaped portion 13 of the trough when the latter is initially placed within the opening for the purpose of sliding the trough within the hutch.

When the trough is arranged within the hutch for use, the channel-shaped portion 13 straddles the center rail of the supporting means, being positioned between the center rail 20 and the uppermost rail 18. Obviously when the trough is arranged in its inverted position, the channel-shaped portion 13 straddles the center rail 20, but is positioned between this rail and the lowermost rail 19. The trough can be quickly and easily arranged in either of said positions by simply removing the trough from the hutch, and then placing it back in the hutch in an inverted position to which it previously occupied. It is manifest from the construction herein shown and described that the feeding of young rabbits can be materially accelerated with a minimum waste of feed, and the operation carried on in a more sanitary way, while the necessity of cleaning crocks and pans that are usually employed is entirely eliminated. Then again, the hutch space usually occupied by said crocks and pans is made available by use of the trough.

While it is believed that the nature and advantages of the invention will be readily apparent, I desire to have it understood that I do not limit myself to what is herein shown and described, and that such changes may be resorted to when desired as fall within the scope of the appended claims.

What is claimed is:

1. In a rabbit hutch, an invertible double trough, and means within the hutch including a member adapted to be slidably embraced by the trough for supporting the latter in either an active or inactive position.

2. In a rabbit hutch having an opening, an invertible duplex trough slidable endwise within the hutch through said opening, and supporting rails arranged within the hutch centrally of said opening cooperating with said trough to support the latter either in a position for use or in an inverted position.

3. In a rabbit hutch, an invertible duplex trough including a channel-like portion, and means arranged within the hutch and including a member received by said channel-like portion to support the trough in either a position for use or in an inverted position.

4. In a rabbit hutch, an invertible double trough slidably received within said hutch, and including a channel-like portion, and a plurality of superimposed rails for supporting the trough in either a position for use or an inverted position, one of said rails being slidably received by said channel-like portion.

5. In a rabbit hutch, spaced superimposed stationary supporting rails, an intermediate relatively movable rail, and an invertible duplex feeding trough including a channel-like portion adapted to slidably receive the said intermediate rail with the trough arranged in either a position for use or an inverted position.

6. In a rabbit hutch, an invertible duplex trough slidably received endwise within the hutch and constrained to rectilinear movement and wholly removable therefrom in order to be inverted, and common means including superimposed rails for supporting the device in either of its two positions.

In testimony whereof I affix my signature.

WILLIAM SHEEHY.